United States Patent
Skanes et al.

[15] 3,662,847
[45] May 16, 1972

[54] TRACK ROLLER SHAFT MOUNTING

[72] Inventors: Fredrick A. Skanes, Burlington; Ludwig E. Aker, Hamilton; Ronald G. Kraemer, Mitchell, all of Ontario, Canada

[73] Assignee: International Harvester Company, Chicago, Ill.

[22] Filed: Jan. 12, 1970

[21] Appl. No.: 2,226

[52] U.S. Cl. ..................180/9.2 R, 305/11, 305/28, 305/60
[51] Int. Cl. .......................................B62d 55/14
[58] Field of Search ..........................305/60, 28, 14; 180/9.2

[56] References Cited

UNITED STATES PATENTS

| | | | |
|---|---|---|---|
| 1,365,937 | 1/1921 | Morgan | 305/60 |
| 2,080,744 | 5/1937 | Rogers | 305/28 UX |
| 2,991,132 | 7/1961 | Schwartz | 305/28 X |

FOREIGN PATENTS OR APPLICATIONS

| | | | |
|---|---|---|---|
| 86,495 | 9/1920 | Switzerland | 305/28 |

*Primary Examiner*—Richard J. Johnson
*Attorney*—Floyd B. Harman

[57] ABSTRACT

Seal bracket and spacer construction for mounting track rollers of a crawler tractor. Brackets are provided which not only carry seals between track rollers and their shafts as well as mount the shafts on side members, but also aid in maintaining the side members in spaced relation to one another. To this end, upwardly projecting extensions on the brackets and a longitudinal plate are provided. The longitudinal plate is the back up member against the top ends of the bracket extensions and is welded at intervals to the side members, to which members the brackets are secured, and which members are secured to the tractor body by gage bars.

12 Claims, 5 Drawing Figures

Inventors:
Frederick A. Skanes
Ludwig E. Aker
Ronald G. Kraemer
By John W. Gaines
Atty.

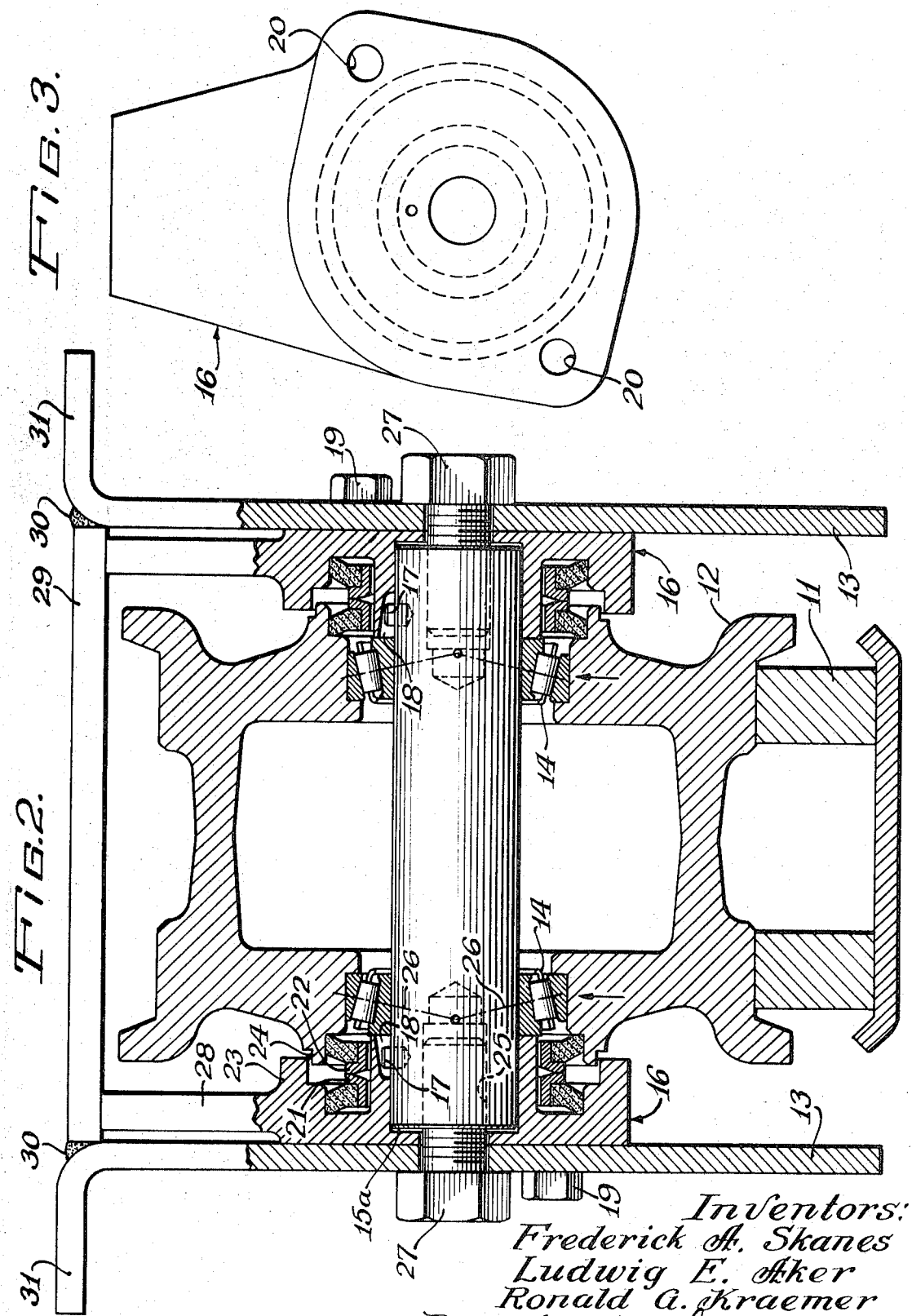

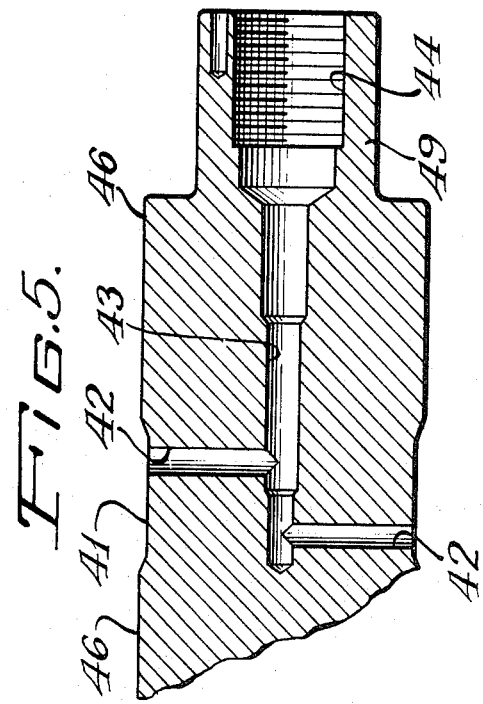
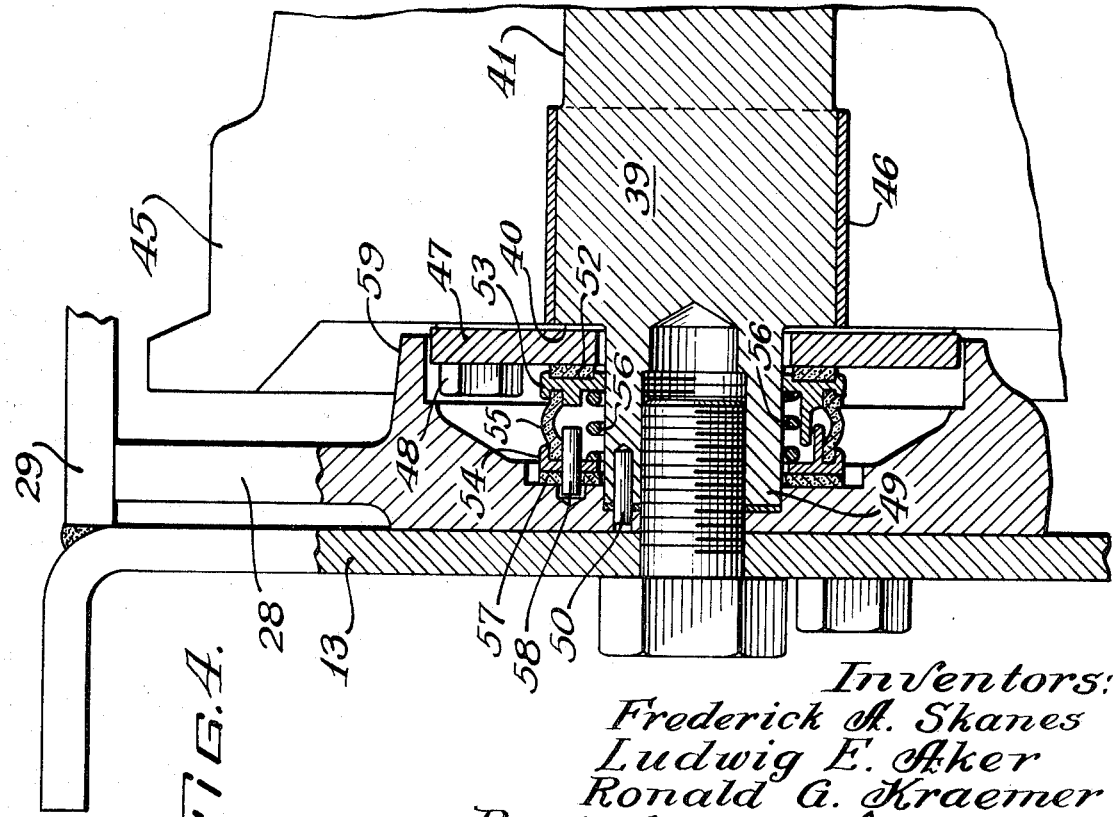

3,662,847

TRACK ROLLER SHAFT MOUNTING

This invention relates to a seal bracket and spacer construction for a tractor. More specifically, the invention relates to such a construction used in a roller shaft mounting for the track rollers of a crawler tractor.

The load of the tractor is transmitted to track rollers from its shafts and is transmitted from the rollers to a pair of endless loops of connected track segments. Customarily, the load reaches the shafts for the track rollers through spaced side members. The construction includes seal brackets between the side members and the shafts. In such a construction, it is difficult to maintain the spacing relative to the frame.

We have developed a novel construction whereby the brackets seal and mount the shafts and maintain the spacing between the side members. More specifically we provide, in a crawler track frame, the usual two-part sub-assembly of a relatively rotatable track roller and roller shaft, there being lateral portions of the roller confronting the sides of the frame and having the shaft ends therein and thereadjacent, and we further provide novel means to fix the shaft in the frame comprising: a pair of seal-and-spacer brackets disposed one at each side of the frame adjacent a roller portion and receiving the adjacent end of the shaft, each bracket having in the plane thereof a load reaction area to be supported; two seals, each between a roller portion and its adjacent bracket; a longitudinal top plate included in the frame and disposed horizontally; and two struts each integral with a supported area in the plane of a bracket to react the load into the longitudinal top plate of the frame.

DESCRIPTION OF THE DRAWINGS

FIG. 2 is a sectional view through a track roller of the crawler tractor, showing the present bracket construction;

FIG. 3 is a side view of a single bracket;

FIG. 4 is a sectional view similar to FIG. 2, showing a modified form of bracket construction and a modified arrangement of roller and its shaft; and FIG. 5 is a fragmentary sectional view of a shaft employed in the modification of FIG. 4.

As shown in FIGS. 1 and 2, the tractor to which the novel bracket construction of the present invention is applied has a body 10 and two endless track assemblies made of connected track links 11 and located at opposite sides of the body, one pair of links 11 appearing in FIG. 2. Each assembly of links 11 is interiorly engaged for support purposes by a plurality of track rollers 12, which may be five in number for each track.

Figure 1:
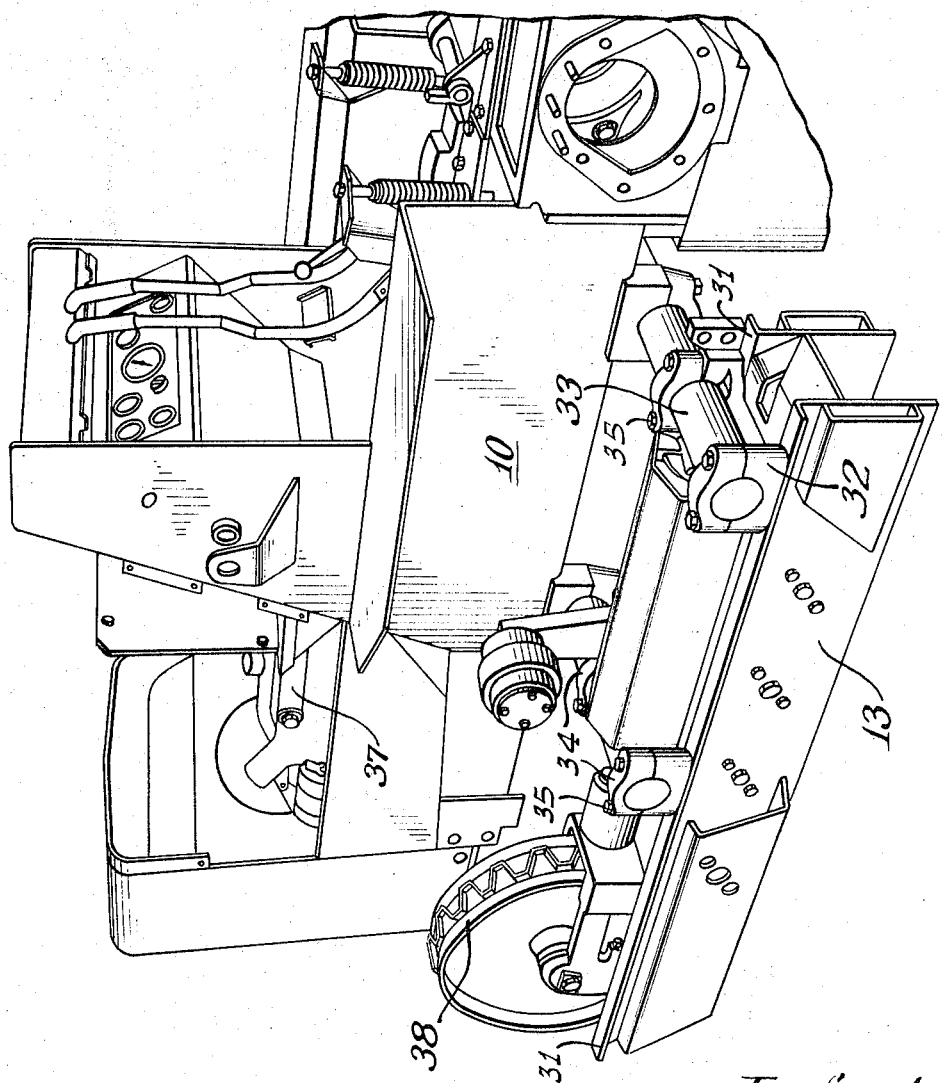
FIG. 1 is a fragmentary perspective of a crawler tractor partially disassembled employing the novel bracket construction of the present invention.

Each group of track rollers 12 is located between two spaced parallel side members 13, which are positioned at the side of the tractor body 10. Each track roller 12 is journalled by means of a pair of conical thrust bearings 14 on a shaft 15. The ends of the shaft 15 are mounted in hub portions 15a of a pair of brackets 16 and keyed thereto against rotation by means of pins 17 set in the shaft 15 and grooves 18 in the hub portions 15a receiving the pins 17.

There are two sets of brackets 16, one set being distributed along the inner face of one side member 13, and the other set being distributed along the inner face of the other side member 13. Each bracket 16 is nonrotatably connected to the adjacent side member 13 by means of a pair of screws 19, which have their heads at the outer face of the side member 13, go through the side member, and are threaded into holes 20 in the bracket 16. As shown in FIG. 3, the two holes 20 in each bracket 16 are in diametrically opposed locations in relation to the associated shaft 15, a line between the two holes being diagonal to the horizontal.

Between each end of the roller 12 and the associated bracket 61, a pair of rubber backed, face seal parts 21 and 22 is provided, the seal part 21 engaging the bracket 16 and the seal part 22 engaging the end of the roller 12. The space in which the seals 21 and 22 are located is more or less closed by a pair of circular flanges 23 and 24 which are radially opposite the seal formed by the parts 21 and 22. The flange 23 is formed on the bracket 16 and is located radially outward of the flange 24 in overlapping relation therewith. The flange 24 is formed on the end of the roller 12.

Each end of the shaft 15 is provided with a large threaded blind bore 25 and lubricant passages 26 leading from the bore 25 to the adjacent bearing 14. A bolt or screw 27 whose head engages the outer face of the adjacent side member 13 and whose end is spaced from the blind end of the bore 25 retains lubricant in the bore 25. Lubricant may be supplied to the bore 25 by a suitable apparatus which is applied to the bore 25 in place of the screw 27. Putting endwise pre-load of the desired amount on the span of bearings 14 results from drawing down the frame sides 13 and brackets 16 on the ends of shaft 15, the sides and brackets being drawn down against a suitable thickness of shims 15a at the shaft ends when the bolts 27 are tightened under their final torque.

As shown in FIGS. 2 and 3, each bracket 16 has an integral, strut-like vertical extension 28 which projects upwardly in spaced apart relationship to the inner face of the adjacent side member 13 and terminates in an upper end somewhat below the top of the side member 13. A longitudinal plate 29 is provided, which backs up the upper end of the bracket extensions 28 in abutting relationship therewith without being directly connected thereto, and has its side edges welded as indicated at 30 to the tops of the side member 13 at longitudinally spaced regions.

The tops of the side members 13 are provided with outwardly directed flanges 31. As shown in FIG. 1, a pair of blocks 32 are provided, which are spaced from one another along the side members 13 and rest on the flanges 31. The blocks 32 are shaped to receive gage bars 33 which are attached to the bottom of the tractor body 10 and project laterally therefrom. The gage bars 33 are secured to the blocks 32 and the blocks 32 to the flanges 31 by means of retainers 34, hold down bolts 35, and nuts, not shown. The retainers 34 engage the tops of the gage bars 33 and the blocks 32. The bolts 35 go through the retainers 34, the blocks 32, and the flanges 31. The nuts, not shown, are threaded on the lower end of the bolts 35 against the lower sides of the flanges 31 of the side members 13.

The tractor is driven by an engine 37 in the body 10 through driving sprockets (not shown), one driving sprocket being located within the rear end of the interior of one loop of connected track links 11, and the other within the rear end of the other loop. Front idlers 38 engage the interior of the front ends of the loops of track links 11, one idler wheel being shown in FIG. 1.

The load of the tractor is transmitted to the gage members 33, the blocks 32, side members 13, brackets 16, shafts 15, and track rollers 12, to the links 11 at the bottom of the endless tracks or loops in engagement with the rollers 12. The tractor load is also transmitted through the longitudinal plate 29 and the strut-like bracket extensions 28 which act as load struts and locators or spacers by virtue of the abutting engagement between the extensions 28 and the plate 29. The longitudinal plate 29 and the bracket extensions 28 help to maintain a proper spaced relationship between the side members 13 within which the track rollers 12 can operate. Such spacing function is performed by the plate 29 and the bracket extensions 28, because the plate 29 is secured to and between the upper sides of the side members 13 and transmits loads to the bracket extensions 28.

As shown in FIGS. 4 and 5, a modified form of the invention is presented in which each of a plurality of shafts 39 has a pair of shoulders 40, each of which is adjacent to but spaced from an end of the shaft and faces that end. Each shaft 39 has at a mid region a wide shallow annular groove 41 to which lubricant passages 42 lead from a central opening 43 having an enlarged threaded end portion 44. The threaded end portion 44 is adapted to be engaged by an apparatus for supplying lubricant to the shaft 39 or by a closure member for retaining lubricant in the shaft.

A roller 45 on each shaft 39 has frictional bearing engagement with portions 46 of the shaft 39 on opposite sides of the wide groove 41. Each roller 45 is positioned on its shaft 39 by means of annular disks 47 which are fastened by means of screws 48 to the roller 45 and engage the shoulders 40 on the shaft 39. Each shaft 39 has reduced end portions 49 which are secured by pins 50 in a pair of brackets 51.

The brackets 51 are similar to the brackets 16 in having vertical upwardly projecting extensions 28 which are slightly spaced from side members 13 and abut the longitudinal plate 29 without being connected thereto. A pair of seals 52 is applied to each shaft 39 and the pair of associated side members 51. Each seal 52 has frictional engagement with one annular disk 47 and is urged thereagainst by an assembly comprising annular members 53 and 54, a ring 55 engaging them, and a coil spring 56 urging them apart. A seal 57 acts between each bracket 51 and the associated annular member 54. A pin 58 holds the bracket 51 against rotational movement with respect to the associated annular member 54. The annular space for each seal 52 formed between the adjacent annular disk 47, end portion 49 of shaft 39, and associated bracket 51 is more or less closed by an annular flange 59 formed on the bracket 51 so as loosely to overlap the periphery of the annular disk 47.

What is claimed is:

1. In a tractor driven by an endless chain assembly formed of connected track segments, the combination comprising a set of track rollers distributed along the interior of the chain in engagement with the lower side thereof, a pair of laterally spaced side members extending along the chain, a set of shafts, one to a roller, journalling the rollers and extending transversely of and between the side members, two sets of brackets, the brackets of one set being distributed along one side member at the surface thereof facing the other side member, the brackets of the other set being distributed along the other side member at the surface thereof facing the other side member, each shaft having one end mounted in a bracket of the said one set and the other end mounted in a bracket of the said other set, the brackets having vertical extensions, one to a bracket, each extension projecting independently of the adjacent side member upwards of the region of the particular bracket mounting the associated shaft, a longitudinal plate abutting the upper ends of the vertical extensions of the brackets and having its side edges joined to upper regions of the side members, seals acting between the ends of each roller and the associated brackets, and means securing the said one side member and the other side member, respectively, to the brackets of said one set and the brackets of said other set.

2. The combination specified in claim 1, the longitudinal plate being joined to the side members by welding, the vertical extensions on the brackets of the said one set and the brackets of the said other set, respectively, being somewhat spaced from the said one side member and the said other side member, the direct relationship of the longitudinal plate with the vertical extensions involving only abutment and being free of connections.

3. The combination specified in claim 2, each roller having a pair of circular flanges, one on one end, the other on the other end, each bracket having a circular flange overlapping the circular flange on the adjacent end of the associated roller, the flange on the bracket and the roll being located outward of the seals between the roller and the bracket so as generally to close the space occupied by the seals, each roller being journalled on the associated shaft by a pair of conical thrust bearings.

4. The combination specified in claim 2, each roller having a pair of shoulders near but spaced from its ends, the shoulders facing its ends, the combination further comprising a pair of annular discs attached to the ends of each roller and extending radially inwards therefrom in overlapping engagement with the shoulders on the associated shaft, each bracket having a circular flange overlapping the outer edge of the annular disc on the adjacent end of the associated roller so as generally to close the space occupied by the seals, each shaft having at a mid region a wide shallow annular groove and lubricant passages leading to the groove, each shaft having direct bearing contact with the associated roller at regions of the shaft beyond the ends of the shallow groove.

5. The combination specified in claim 2 and further comprising a plurality of pairs of screws joining the brackets to the side members, each pair of screws being applied to a single bracket in diametrally opposed locations in relation to the associated shaft, a line between the screws of each pair being inclined to the horizontal.

6. In a tractor driven by a closed loop formed of connected track segments and located at the side of the tractor body, the combination comprising gage bars extending from the tractor body at regions thereof spaced longitudinally thereof, a pair of laterally spaced side members extending along the tractor body and having flanges at their upper edges, a pair of blocks bridging the side members and secured to the flanges thereof and to the gage bars, a set of track rollers distributed along the interior of the loop of track segments in engagement therewith, shafts journalling the rollers, a plurality of brackets distributed along the inner faces of the side members and mounting the ends of the shafts, seals operating between the rollers and the brackets, means securing the brackets to the side members, the brackets having vertical extensions projecting upwards beyond the seals and the securing means, and a longitudinal plate resting on the upper ends of the vertical extensions on the brackets and being welded to the side members adjacent the flanges.

7. In a crawler vehicle having a track frame, and an assembly therein of a relatively rotatable track roller and roller shaft, said shaft being connected to the side members of the frame so as to bridge therebetween and be supported in part thereby, there being lateral portions of the roller confronting said frame side members and having the shaft ends in and adjacent the roller, the combination with the frame, shaft, and roller, of means to fix the shaft in the frame in proper spacing thereto, comprising:

a pair of seal brackets disposed one at each side of the frame adjacent a roller portion and receiving the adjacent end of the shaft, each bracket having in the plane thereof a load reaction portion to be supported;

two seals, each between a roller portion and its adjacent bracket;

a longitudinal top plate included in the frame so as to go from one side thereof to the other and disposed horizontally; and two spacer struts intermediate and generally parallel to the frame side members, each strut secured to a supported portion aforesaid in the plane of a bracket, and directly engaged and supported by the longitudinal top plate of the frame.

8. The invention of claim 7, characterized by sets of bolts (19) each nonrotatably connecting a supported portion of a bracket to the side of the frame to prevent rotation.

9. The invention of claim 8, characterized by non-rotatable means (17) connecting a supporting portion of each bracket to the adjacent end of the shaft to prevent rotation.

10. The invention of claim 7, characterized by two bearings (14) each connecting a roller portion for antifriction relative rotation to and upon the adjacent nonrotatable shaft end.

11. The invention of claim 10, characterized by two side bolts each connecting a shaft end to the side member of the frame at that side and pre-loading and supporting the assembly on the frame.

12. In a crawler vehicle having a track frame, and an assembly therein of a relatively rotatable track roller and roller shaft, there being lateral portions of the roller confronting the sides of the frame and having the shaft ends therein and thereadjacent, the combination with the frame, shaft, and roller, of means to fix the shaft in the frame comprising:

a pair of seal brackets disposed one at each side of the frame adjacent a roller portion and receiving the adjacent end of the shaft, each bracket having in the plane thereof a load reaction portion to be supported;

two seals, each between a roller portion and its adjacent bracket;

a longitudinal top plate included in the frame and disposed horizontally; and two spacer struts each integral with a supported portion in the plane of the bracket, and directly engaged and supported by the longitudinal top plate of the frame.

* * * * *